United States Patent [19]
Nemirovsky et al.

[11] Patent Number: 5,652,841
[45] Date of Patent: Jul. 29, 1997

[54] METHOD AND APPARATUS FOR AGGREGATING TERMINALS INTO CLUSTERS TO ASSIST IN THE CONSTRUCTION OF A DISTRIBUTED DATA COMMUNICATION NETWORK

[76] Inventors: Paul Nemirovsky, 3 Bouldercrest Ct., Rockville, Md. 20850; Michael Ball, 1012 S. Mansion Dr., Silver Spring; Roy Dahl, 8152 Mandan Ter., Greenbelt, both of Md. 20770

[21] Appl. No.: 487,342

[22] Filed: Jun. 7, 1995

Related U.S. Application Data

[63] Continuation of Ser. No. 135,141, Oct. 12, 1993, abandoned, which is a continuation of Ser. No. 475,885, Feb. 6, 1990, abandoned.

[51] Int. Cl.$^6$ .............................. H04M 7/00; G06F 17/60
[52] U.S. Cl. ........................ 395/201; 379/111; 379/219; 395/200.02; 395/200.1
[58] Field of Search ..................................... 379/219, 220, 379/229, 333, 334, 111, 92; 395/200.02, 200.1; 364/401 R, 402

[56] References Cited

U.S. PATENT DOCUMENTS 5,253,161 10/1993 Nemirovsky et al. .
5,426,674 6/1995 Nemirovsky et al. ................. 395/200

OTHER PUBLICATIONS

*Networking in the 90s Proceedings—IEEE INFOCOM*, vol. 1, IEEE Cat. No. 91CH2979–3, 1993, Bouloutas et al., "Clustering schemes for network management", pp. 111–120.

IEEE Cat. No. 88CH2535–3, 1988, Jiandong et al., "An adaptive cluster algorithm for a self–organizing communication network", pp. 1653–1656.

*Networks 86 Conference Record*, Cat. No. 86CH2278–0), 1986, Agrawal, "Optimizing the design of a cluster of nodes in a large packet network", pp. 207–211.

*Illinois U. at Urbana–Champaign, Coordinated Science Lab. Report No. R–1025*, Dec. 1984, Rossi, "Clustering Algorithms for Hierarchical Routing in Networks", 40 pp.

*Networks*, vol. 10, No. 3, 1980, Kleinrock et al., "Optimal clustering structures for hierarchical topological design of large computer neworks", pp. 221–248.

*IEEE Transactions on Communications*, vol. COM–24, No. 10, 1976, Dirilten et al., "Topological design of teleprocessing networks using linear regression clustering", pp., 1152–1159.

*Electronics and Communications in Japan*, part 3, vol. 71, No. 5, 1989, Ishida, "Cluster–based management of large computer networks", pp. 44–52.

*IEEE Cat. No. 89CH2702–9*, 1989, Betser et al., "Configuration synthesis for a heterogeneous backbone cluster and a PC–interface nework", pp. 400–407.

*Computer Communications*, vol. 2, No. 3, Jun. 1979, Vilis et al., "Clustering algorithm for the topological design of hierarchical, multidrop data networks", pp. 105–110.

Primary Examiner—Robert A. Weinhardt
Assistant Examiner—Krishna V. Kalidindi
Attorney, Agent, or Firm—Kenyon & Kenyon

[57] ABSTRACT

A method and apparatus for aggregating terminals into clusters that assists in the construction of a distributed data communication network. Terminal locations to be clustered are used as input along with a weight for each one representing the traffic carried by that location. The terminals are placed into boxes based on their geographic coordinates and only boxes with substantial traffic are retained. Any terminals included in a box not retained are assigned to the closest retained box. The retained boxes are merged into clusters so long as the maximum cluster traffic and maximum cluster radius are not exceeded. The center of mass of the resulting clusters are then determined. The representative locations of the resulting clusters are determined as the location of the terminal in the cluster closest to the center of mass.

51 Claims, 8 Drawing Sheets

Terminal/Host Clusters — v2.0

| Cluster No. | Design ID | V Coord | H Coord | Cluster Weight |
|---|---|---|---|---|

Design Locations

| Clust# | Loc ID | V Coord | H Coord | Lata | St | Vir | Term | T/H | Flag: | Conc | BackB |
|---|---|---|---|---|---|---|---|---|---|---|---|
| 0 | ALBIRM | 7518 | 2446 | 476 | AL | | 0 | Y | | 0 | 0 |
| 0 | ALMONT | 7692 | 2247 | 478 | AL | | 0 | Y | | 0 | 0 |
| 0 | ARLROC | 7721 | 3448 | 528 | AR | | 0 | Y | | 0 | 0 |
| 0 | AZPHOE | 9133 | 6748 | 666 | AZ | | 0 | Y | | 0 | 0 |
| 0 | AZTUCS | 9347 | 6469 | 668 | AZ | | 0 | Y | | 0 | 0 |
| 0 | CAFRES | 8669 | 8239 | 728 | CA | | 0 | Y | | 0 | 0 |

Terminal/Host Traffic — v2.0

| Source: Loc ID | Dev ID | Dest: Loc ID | Dev ID | Peak Byte | Profile ID |
|---|---|---|---|---|---|
| ALBIRM | T | CALANG | H | 61.5 | 1 |
| ALBIRM | T | DCWASH | H | 61.5 | 1 |
| ALMONT | T | CALANG | H | 209.6 | 1 |

Count: 3

Enter in peak byte traffic.
Char Mode: Replace Page 1

FIG.4

─────────────── BACKBONE SITES ─────────────── v2.2

| Loc ID | Dev | Node Num. | Cost | Avail | Exist | Chosen? Y/N | ⌐T1 Site⌐ Chos? Y/N | Node Num | Switch ID | Number of Increments | Pack Line |
|---|---|---|---|---|---|---|---|---|---|---|---|
| ALMONT | BB | 5 | 4000.00 | 0 | N | N | | | BB | | |
| CALANG | BB | 8 | 4000.00 | 0 | N | N | | | BB | | |
| CAOAKL | BB | 7 | 4000.00 | 0 | N | N | | | BB | | |
| COAURO | BB | 6 | 4000.00 | 0 | N | N | | | BB | | |
| ILCHIC | BB | 4 | 4000.00 | 0 | N | N | | | BB | | |
| MABOST | BB | 0 | 4000.00 | M | N | N | | | BB | | |
| NJTREN | BB | 1 | 4000.00 | 0 | N | N | | | BB | | |
| OHCINC | BB | 3 | 4000.00 | 0 | N | N | | | BB | | |
| VARICH | BB | 2 | 4000.00 | 0 | N | N | | | BB | | |

Design Switches: Page Down Key

Count: *9

FIG.7A

———— CONCENTRATORS ———— v2.0

| Loc ID | Dev ID | Node # | Chosen Switch Node # | Switch Type | Switch Cost | Avail (O.M) | Exist Y/N |
|---|---|---|---|---|---|---|---|
| ARLROC | LS | 2 | | S | 700.00 | 0 | N |
| CALANG | LS | 19 | | S | 700.00 | 0 | N |
| CAOAKL | LS | 6 | | S | 700.00 | 0 | N |
| COAURO | LS | 3 | | S | 700.00 | 0 | N |
| DCWASH | LS | 13 | | S | 700.00 | 0 | N |
| FLTAMP | LS | 4 | | S | 700.00 | 0 | N |
| GAATLA | LS | 1 | | S | 700.00 | 0 | N |
| ILCHIC | LS | 15 | | S | 700.00 | 0 | N |
| ILSPRI | LS | 17 | | S | 700.00 | 0 | N |
| KYLOUI | LS | 16 | | S | 700.00 | 0 | N |
| LABROU | LS | 5 | | S | 700.00 | 0 | N |
| MABOST | LS | 9 | | S | 700.00 | 0 | N |
| MOKCIT | LS | 21 | | S | 700.00 | 0 | N |
| NCCHAR | LS | 20 | | S | 700.00 | 0 | N |

Average Computed Bytes per Packet (Profile 0): 65

Design Concntrators: Page Down Key

Char Mode: Replace   Page 1   Count: 14

FIG.7B

METHOD AND APPARATUS FOR AGGREGATING TERMINALS INTO CLUSTERS TO ASSIST IN THE CONSTRUCTION OF A DISTRIBUTED DATA COMMUNICATION NETWORK

This application is a continuation of U.S. patent application Ser. No. 08/135,141 filed on Oct. 12, 1993, now abandoned which was a continuation of U.S. patent application Ser. No. 07/475,885 filed on Feb. 6, 1990, now abandoned.

TECHNICAL FIELD

This invention relates generally to distributed data communication networks, and more particularly, to a method and apparatus that aggregates terminals into clusters so that a distributed data communications network can be constructed that will meet its performance specifications in the most economical and efficient manner.

BACKGROUND OF THE INVENTION

The design of distributed data communications network topologies has been practiced for many years. The need for a comprehensive method for designing a distributed data communication network results from the complexity of such a system. A distributed data communications network is a hierarchical system of hardware components arranged so that each hardware device is connected, directly or indirectly, to every other device. At the lowest level are user terminals or hosts, which form part of the local access network. These terminals are linked to one or more concentrators, which are statistical multiplexers with protocol conversion functionalities with several low data rate input, data lines, and a fewer number of high data rate, output data lines. The concentrators form the second level of the hierarchy and, together with the terminals, form the access network.

The concentrators, which may be connected to other concentrators in a hierarchical fashion, are ultimately connected to the backbone, which forms the highest level in the hierarchy. The backbone consists of high speed, high capacity links that terminate at backbone nodes. A backbone node consists of one or more devices, and includes at least one switching device for routing traffic within the backbone. The data traffic from the concentrators enters the backbone at a backbone node.

The larger number of terminal locations typically present in a distributed data communications network means that there is a need for a method for aggregating terminals into clusters in order to most efficiently and economically construct and evaluate the network. These clusters can be treated as virtual terminals which simplifies the subsequent analysis by reducing the number of individual terminals that must be considered. Alternatively, these clusters can be considered as potential locations for concentrators or backbone nodes.

Existing methods for aggregating the terminals of a distributed data communications network into clusters have deficiencies that are overcome by the present invention. Other systems for aggregating terminals into clusters have been so vendor-specific that they could only be used to construct a network with equipment provided by a limited number of vendors, and in some cases with the equipment provided by only a single vendor. Still other generic methods, while not limited to specific vendors' hardware, do not address the hardware capabilities with sufficient detail to permit the selection of particular hardware components.

SUMMARY OF THE INVENTION

The present invention is directed to a method and apparatus used to aggregate terminals into clusters that assists in the construction of a distributed data communications network which overcomes the limitations of the prior art. More specifically, the invention is composed of an interactive personal computer-based software tool used as one component to aid in the construction of distributed data communications networks that make use of existing communications equipment.

This system takes as input a set of terminal locations that are to be clustered and a weight for each one that represents the traffic carried by that location. The traffic is the quantity of data transmitted per unit time. The parameters of this system which are to be specified by the user include: the total number of clusters to be formed; the minimum weight of the smallest cluster; the maximum weight assigned to a single cluster; and the maximum distance from the center of the cluster that a terminal assigned to it can be located. If desired, the user can constrain each cluster to a single local access and transport area (LATA). Also, the user can manually select the location of cluster centers. If the location of the cluster center is left unspecified, the system will determine the location based on the weighted average of each terminal site within the cluster. The output of this system is either virtual terminals, candidate backbone sites, or candidate concentrator sites. The user determines which type of output is to be produced. Each virtual terminal represents several real terminals, thereby simplifying the subsequent analysis by reducing the number of individual terminals that must be considered. If the user chooses to cluster terminals so that either candidate backbone sites or candidate concentrator sites are produced, these sites will be chosen from a larger list of candidate sites that was initially supplied by the user.

The above is a brief discussion of some of the prior art and features of the invention. Other advantages of the invention can be gleaned from the detailed discussion of the preferred embodiment that follows.

BRIEF DESCRIPTION OF THE DRAWINGS

FIG. 4 is an input data table for some of the terminals shown in FIG. 3.

FIGS. 7A and 7B show the output of the terminal clustering module in tabular form.

DETAILED DESCRIPTION

Figure 1:
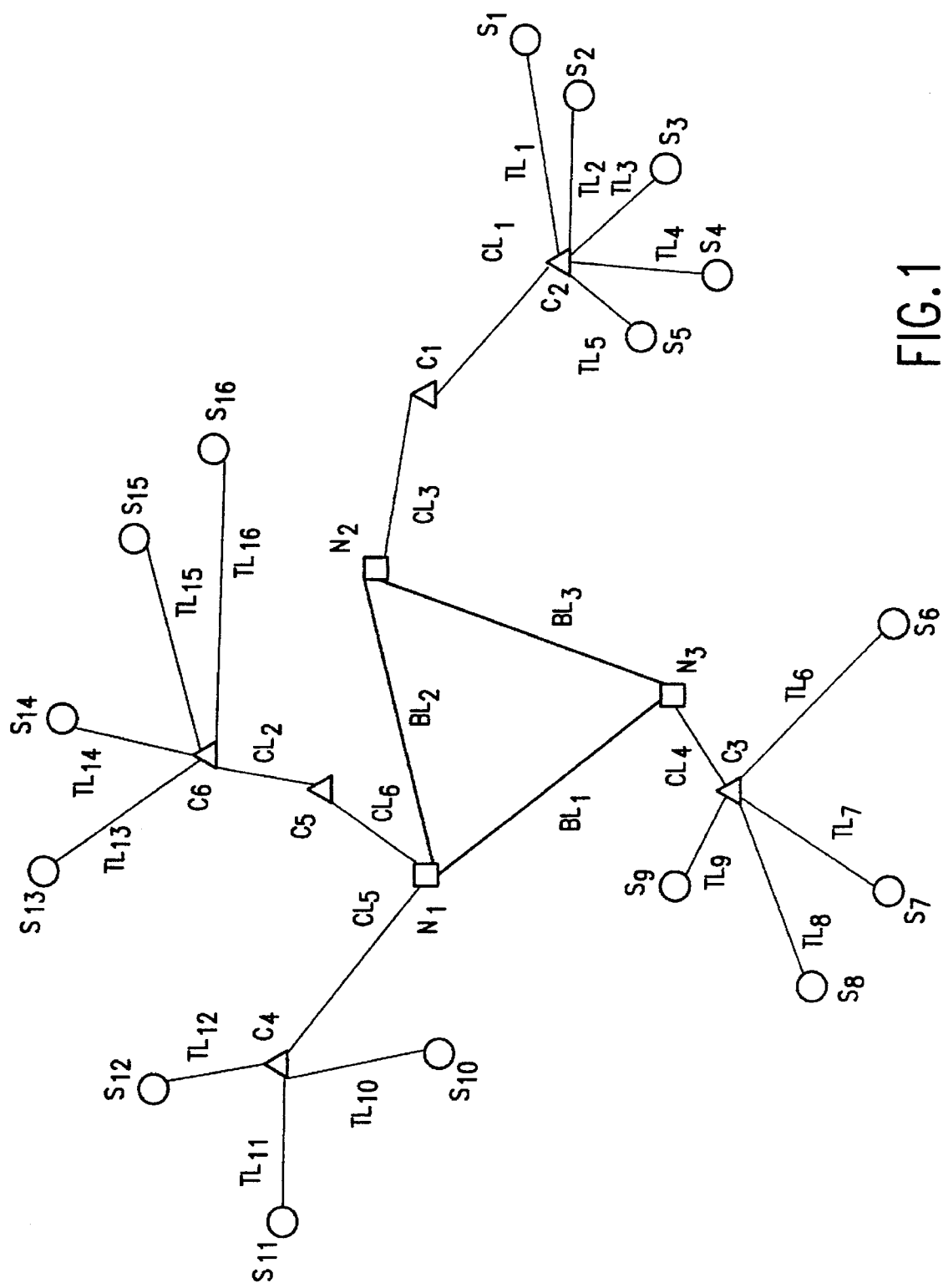
FIG. 1 is a schematic diagram depicting a distributed data communications network, which includes backbone nodes, concentrators, and traffic sources, as well as the data link lines between them.

An example of a distributed data communications network is shown in FIG. 1. The network is depicted as a set of interconnected data terminals $S_1$–$S_{16}$, which can be any of a variety of real terminals. The terminals are connected to concentrators $C_1$–$C_6$ such as Telenet Communications Corporation model number TP 3000 series multiplexers. The concentrators are in turn connected to backbone nodes $N_1$–$N_3$, which contain data switches such as a Telenet Communications Corporation TP4/III series switch. The traffic sources $S_1$–$S_{16}$ are connected to the concentrators $C_1$–$C_6$ by data link lines $TL_{1-15}$ that are leased from the local telephone service providers. The concentrators $C_1$–$C_6$ may be connected to other concentrators $C_1$–$C_6$ by data link lines $CL_1$–$CL_2$, or, the concentrators can be connected directly to the backbone nodes by data links $CL_3$–$CL_6$. Both of these types of lines are leased from local telephone service providers. The backbone nodes $N_1$–$N_3$ are connected together by backbone data lines $BL_1$–$BL_3$, which are high-volume leased data lines such as T1 fiber-optic lines leased from a long-distance telephone service provider such as U.S. Sprint. The invention is a method for aggregating terminals into clusters to assist in the construction of a distributed data communications network.

The hardware components shown schematically in FIG. 1 can represent a variety of hardware devices. Each terminal $S_i$ represents either a physical user terminal, or a virtual terminal composed of an aggregate of more than one physical terminal. In general, a single physical location may have more than one hardware device. For example, a backbone node location $N_i$ can have, in addition to a switch, other devices such as concentrators. The links $TL_i$, $CL_i$, and $BL_i$ can also be analog or digital lines.

Figure 2:
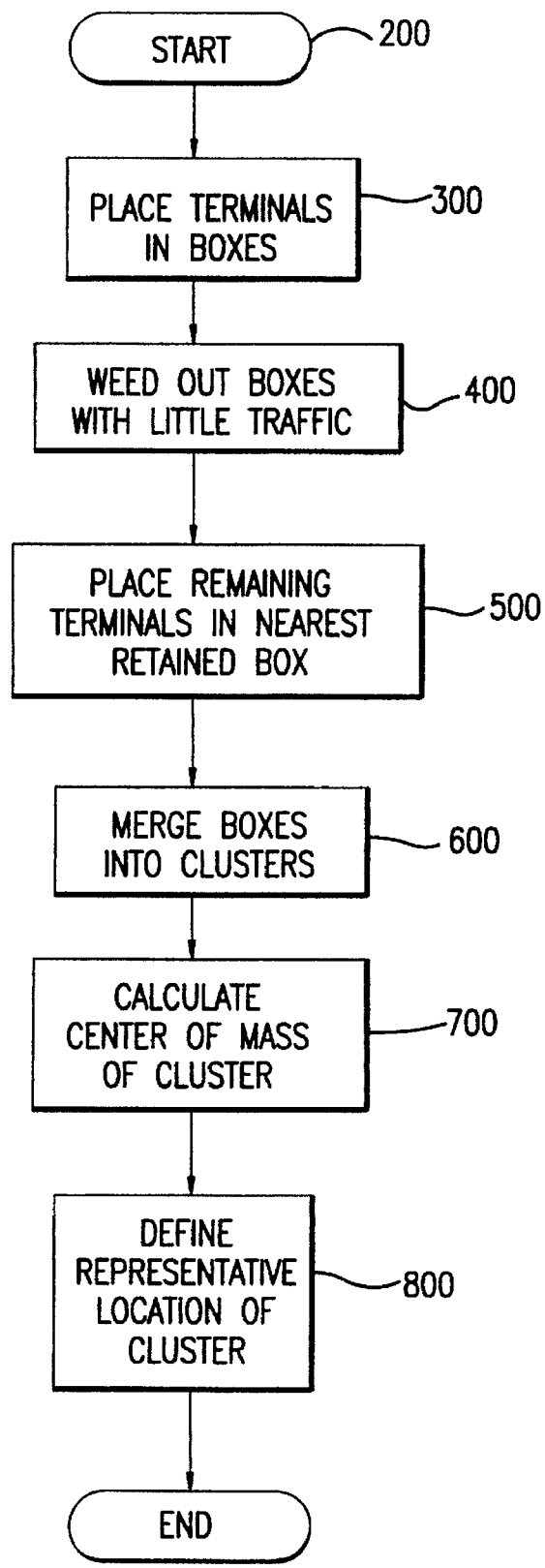
FIG. 2 is a flow diagram illustrating the steps of the present invention.

The steps of the method of the present invention are shown in FIG. 2. The method used is a generalization of the classic COM method. The basic COM method is modified in order to improve the quality of the results. In Step 300, the geographic region over which the terminals are located are divided into boxes. The user enters a parameter giving the number of boxes to be used. This parameter defines the dimension of the grid to be used for clustering. The value of this parameter squared must be less than or equal to the number of terminals. The basic COM method has been improved to manipulate very large grids. Increasing this value will tend to increase the accuracy of the results.

Instead of computing the distance between every pair of terminals as is done in the basic COM method, which is very time-consuming for large networks, each terminal is placed in the appropriate box based on its geographic coordinates. The geographic coordinates of the terminals can be given either in terms of their standard AT&T V, H coordinates or their area code/exchange coordinates. For each box, the total traffic is computed along with the center of mass of the box as determined by the traffic associated with each terminal.

In Step 400, those boxes with significant traffic are retained as candidates for clusters. This is accomplished by "weeding out" those boxes with little or no traffic associated with them. This determination is made by several criteria. Boxes are retained with traffic above a given factor multiplied by the average traffic of a terminal in the box. However, boxes with less weight than this threshold are kept if there are too few boxes retained and/or too little traffic in the retained boxes. This determination is controlled by user parameters specifying the minimum fraction of boxes to be retained and the minimum fraction of retained weight. Thus, the user can ensure that the boxes retained are reasonably representative of the original network.

In Step 500, each terminal not already associated with a retained box is associated with the nearest adjacent retained box, or, in the case where none of the adjacent boxes have been retained, the terminal is simply left in its own geographic box. The location of each box is defined by its center of mass which was determined in Step 300. Thus, at the end of Step 500, each terminal is associated either with a retained box containing a substantial amount of traffic or an unretained box containing otherwise unaffiliated terminals. Ideally at this point, the clustering will have produced a configuration where most of the terminals are in retained boxes and the number of these boxes is large enough not to impede further clustering efforts, but small enough to continue comfortably.

In Step 600, given parameters defined by the user controlling the maximum weight and radius of a cluster, a center of mass approach is used to merge the boxes that have already been formed. The basic COM method simply merges nearest-neighbor clusters. In the present invention, the clustering proceeds by merging the smallest box with the nearest neighbor, updating the center of mass after the clusters have been merged. This coalescing continues until no further merging is allowed as a result of the size and radius limitations defined by the user or until a pre-specified number of clusters have been formed.

In Step 700, the center of mass of each of the remaining clusters is determined. In addition, the remaining terminals which are still unaffiliated with any clusters are assigned to the cluster it is nearest. Thus, a set of clusters of reasonably balanced size remains.

In Step 800, the location of the terminal closest to the center of mass of each cluster as determined in Step 700 is chosen as the representative location for that cluster. If the user initially entered candidate cluster centers, these are considered first as cluster locations. Only if these locations are not within the cluster is another location within the cluster used.

Figure 3:
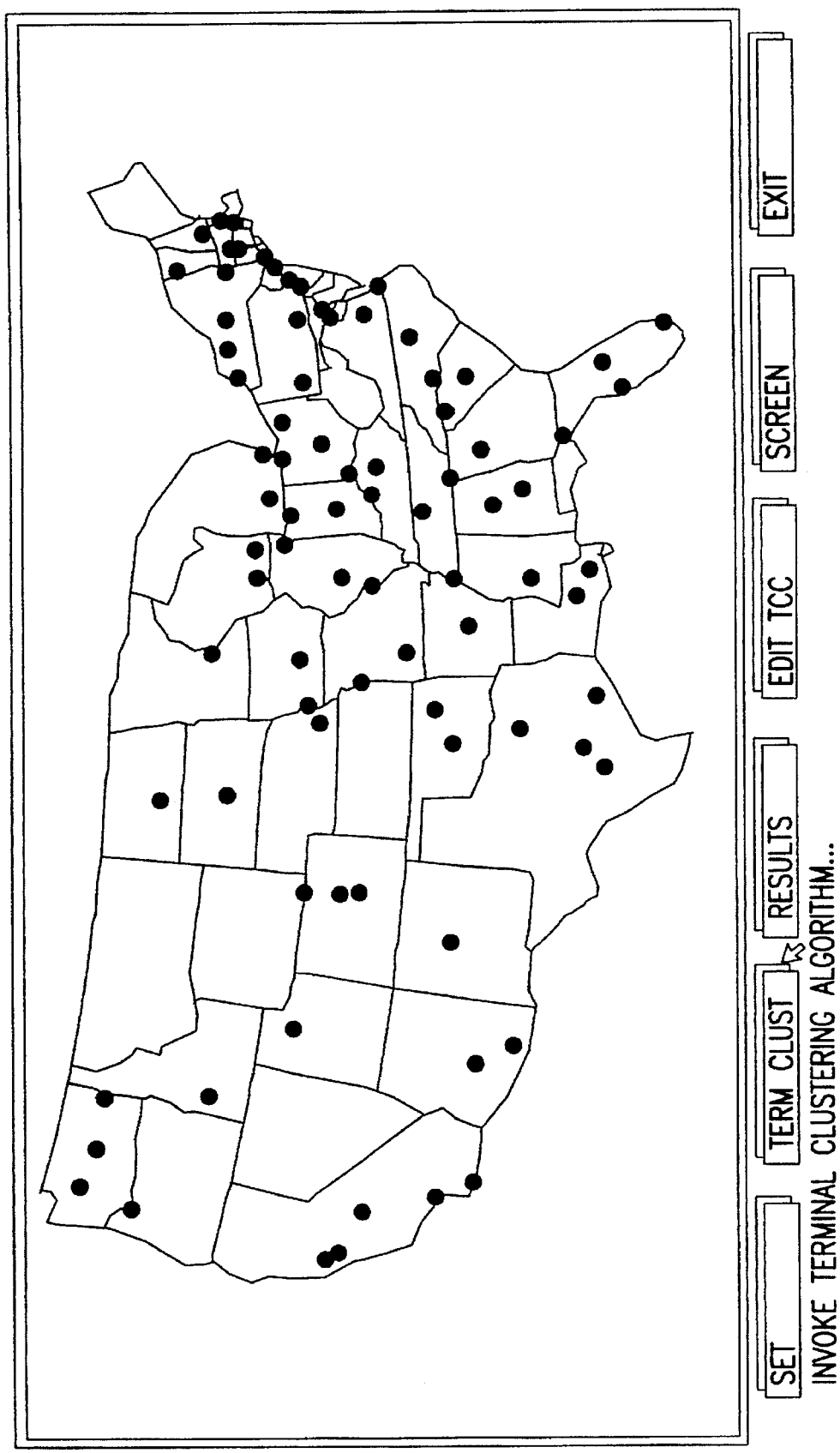
FIG. 3 shows a map of the network configuration.

For purposes of illustrating the method of this invention, numerical examples will be presented which correspond to the network configuration shown in FIG. 3. In order to cluster the terminals, the locations of each terminal must be specified as well as the weight for each one that represents the traffic carried by that location. Each terminal location can be a potential concentrator site or a potential backbone site and this must also be specified. The locations of the terminals in the network can be fixed in a two-axis coordinate system by specifying their locations in standard AT&T V, H coordinates or as area code/exchange locations. Information about some of the terminals of the network shown in FIG. 3 is presented in FIG. 4.

Figure 5:
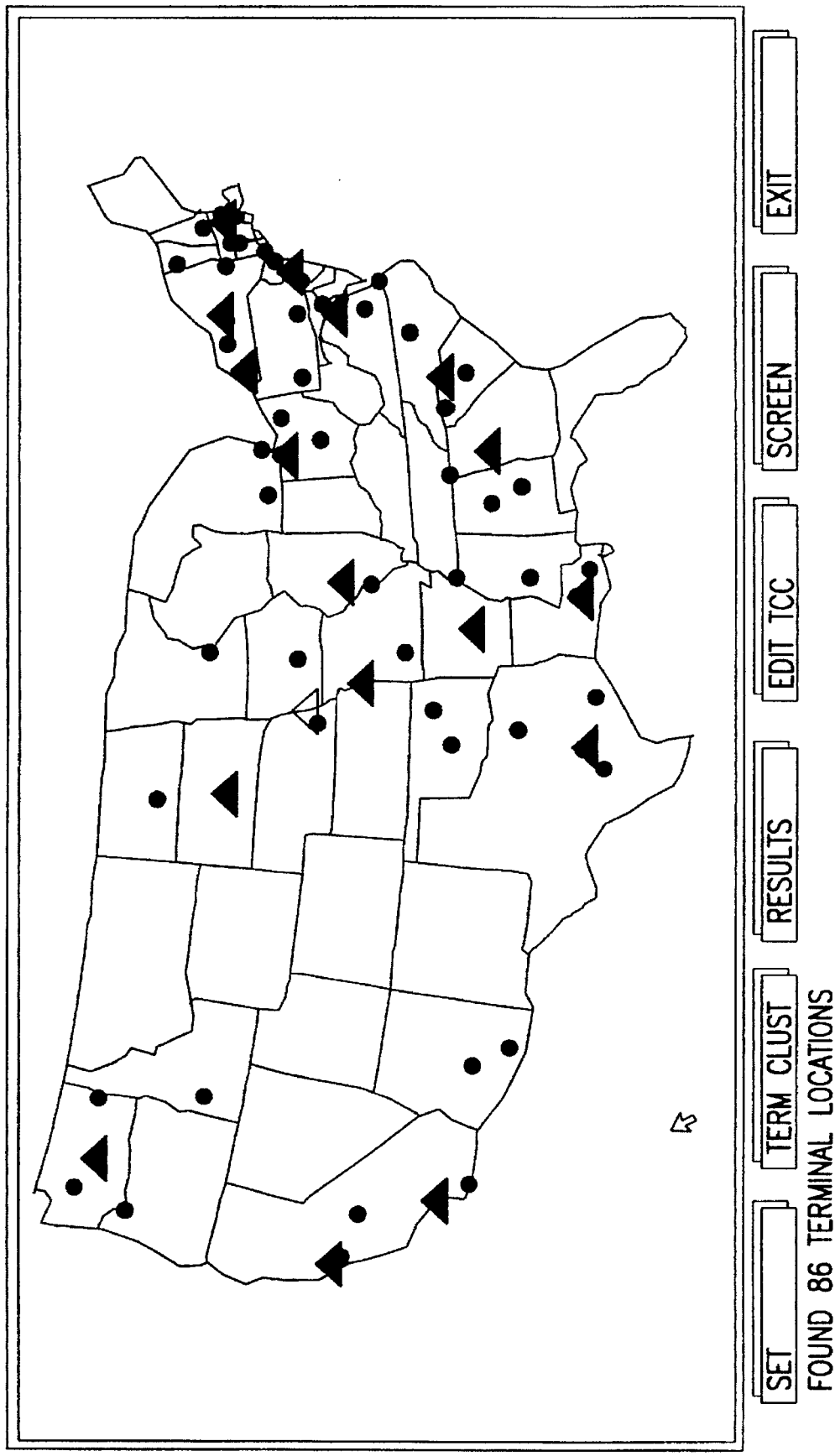
FIG. 5 shows a map of the output for the candidate cluster sites and the candidate concentrator sites.
Figure 6:
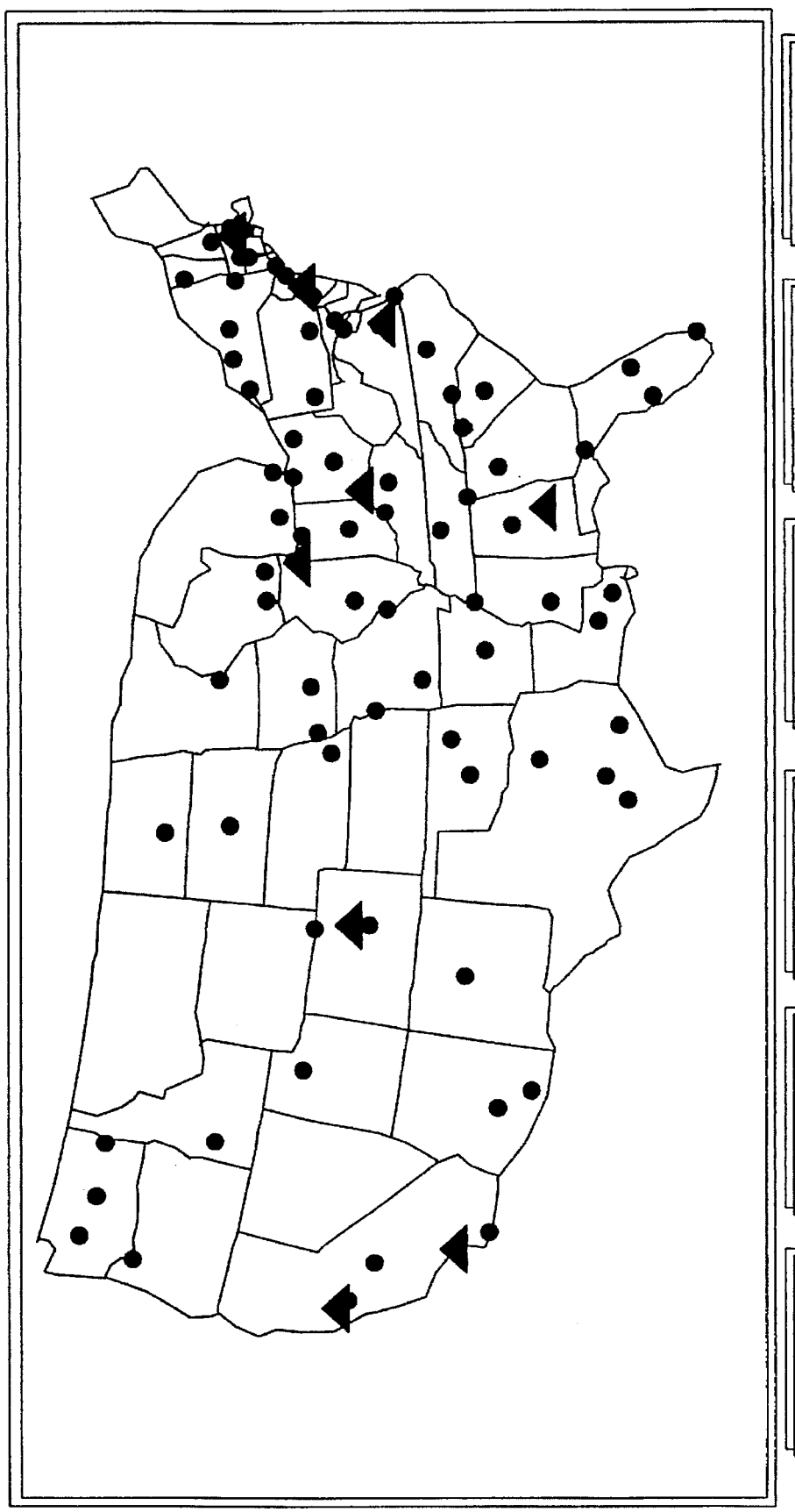
FIG. 6 shows a map of the output for the candidate cluster sites and the candidate backbone sites.

This system associates each terminal with a virtual terminal, a candidate concentrator site, or a candidate backbone site. This output is shown in FIGS. 5 and 6. FIG. 5 shows candidate cluster sites as solid circles and candidate concentrator sites as solid triangles. FIG. 6 shows the candidate cluster sites and the candidate backbone sites, now indicated as solid triangles.

FIGS. 7A and 7B show the output of the terminal clustering in tabular form, indicating both the candidate concentrator and the candidate backbone sites.

The preferred embodiment of the invention described above represents one desirable, workable embodiment of the invention. It is to be understood that the methodology described herein is not limited to specific forms disclosed by way of example and illustration, but may assume other embodiments and methods limited only by the scope of the appended claims and their equivalents.

What is claimed is:

1. In a communication network having a number of terminals, backbone nodes for routing communication traffic within a backbone, and concentrators connected between said terminals and said backbone nodes, said network extending throughout a geographic region, a computer implemented method for aggregating the terminals into clusters comprising steps of:

a) dividing said geographic region over which the network extends into subregions;

b) defining a number of subregions to be used, the square of the number of subregions being less than or equal to the number of terminals;

c) assigning each terminal to a subregion based on its geographic coordinates;

d) computing the total communication traffic within a backbone in each subregion;

e) computing a center of each subregion based on a weighted average of each terminal assigned to the subregion, the weighted average of each terminal corresponding to an amount of traffic associated with that terminal;

f) retaining subregions with computed traffic greater than a predetermined significant traffic value as candidate clusters;

g) assigning those terminals not associated with a retained subregion to the nearest adjacent retained subregion, or if no such subregion is available placing the terminal in its own subregion;

h) merging the clusters based on user-defined parameters by clustering the smallest subregion with its nearest neighbors;

i) determining a center of the newly merged clusters based on a weighted average of each terminal of the cluster, the weighted average of each terminal corresponding to an amount of traffic associated with that terminal;

j) choosing the location of the terminal closest to the center of each newly merged cluster as the representative location of that cluster; and k) directing communication traffic from a first of said terminals through said terminal closest to the center of the cluster in which said first terminal is located to a second of said terminals through said terminal closest to the center of the cluster in which said second terminal is located.

2. The computer implemented method for aggregating the terminals into clusters of claim 1 further comprising repeating the steps (a) through (h) and selecting a most economically efficient network for operation.

3. The computer implemented method of claim 1, wherein the step of directing communication traffic includes directing communication traffic from the first terminal to the second terminal via at least one of said backbone nodes and at least one of said concentrators.

4. An apparatus for efficiently connecting a number of terminals through backbone nodes, a backbone, and concentrators including a computer based interactive device for aggregating the terminals into clusters of a distributed communications network having a plurality of terminals, backbone nodes for routing traffic within a backbone, and concentrators connected between said terminals and said backbone nodes, said computer based interactive device comprising:

a) a user input device of said computer receiving inputs including:
   a first set of data corresponding to terminal locations to be clustered, and
   a second set of data corresponding to weights corresponding to the traffic carried by each terminal location;

and said user input device of said computer receiving specified parameters including:
   a total number of terminal clusters to be formed,
   a minimum weight of a smallest of said terminal clusters to be formed,
   a maximum weight of a largest of said terminal clusters to be formed, and
   a maximum radius of said terminal clusters to be formed;

said user input device selecting a system output mode;

b) a processor of said computer creating a number of subdivisions based on said total number of terminal clusters to be formed, wherein a square of the number of subdivisions is less than or equal to the number of terminals;

said processor assigning each terminal to one of said group of subdivisions based on its location;

said processor determining a total traffic for each of said group of subdivisions based on the weights of the terminals assigned to it by said processor;

said processor determining a center of each of said group of subdivisions based on the weights and the locations of the terminals assigned to it by said processor;

said processor forming a set of candidate subdivisions based on the total traffic for each of said group of subdivisions;

said processor defining a location for each of said group of subdivisions;

said processor assigning terminals in a subdivision not included in said set of candidate subdivisions to a subdivision in said set of candidate subdivisions;

said processor merging subdivisions in said set of candidate subdivisions into clusters;

said processor updating centers of said clusters of merged subdivisions based on the weights and the locations of terminals of said clusters; and said processor determining the representative locations of said clusters of said merged subdivisions; and said processor directing communication traffic from a first of said terminals through said representative location of the cluster in which said first terminal is located to a second of said terminals through said representative location of the cluster in which said second terminal is located.

5. The apparatus including the computer based interactive device of claim 4 wherein said processor creates a group of subdivisions by executing a first group of processor implemented instructions;

said processor assigns each terminal to one of said group of subdivisions by executing a second group of processor implemented instructions;

said processor determines a total traffic for each of said group of subdivisions by executing a third group of processor implemented instructions;

said processor determines a center of each of said group of subdivisions by executing a fourth group of processor implemented instructions;

said processor forms a set of candidate subdivisions by executing a fifth group of processor implemented instructions;

said processor defines a location for each or said group of subdivisions by executing a sixth group of processor implemented instructions;

said processor assigns terminals in a subdivision not included in said set of candidate subdivisions to a subdivision in said set of candidate subdivisions by executing a seventh group of processor implemented instructions;

said processor merges subdivisions in said set of candidate subdivisions into clusters by executing an eighth group of processor implemented instructions;

said processor updates centers of said clusters of merged subdivisions by executing a ninth group of processor implemented instructions;

said processor determines the representative locations of said clusters of said merged subdivisions by executing a tenth group of processor implemented instructions; and said processor directs communication traffic by executing an eleventh group of processor implemented instructions.

6. The apparatus including the computer based interactive device of claim 4 wherein said system output mode is selected from a group of output modes consisting of virtual terminals, candidate backbone sites, and candidate concentrator sites.

7. The apparatus including the computer based interactive device of claim 4 wherein said parameters specified by said user input device further includes a minimum fraction of retained subdivisions and a minimum fraction of retained weight, and wherein said processor forming a set of candidate subdivisions, calculates a threshold traffic value based on the average traffic of terminals in a subdivision, compares the total traffic for each subdivision determined by said processor with the calculated threshold traffic value, and adds a subdivision to said set of candidate subdivisions if its total traffic is at least equal to said calculated threshold traffic value.

8. The apparatus including the computer based interactive device of claim 7 wherein if the number of subdivisions in said set of candidate subdivisions divided by the total number of subdivisions is less than the minimum fraction of retained subdivisions, some subdivisions having a total traffic less than said calculated threshold traffic value are added to said set of candidate subdivisions.

9. The apparatus including the computer based interactive device of claim 7 wherein if the total weight of the subdivisions in said set of candidate subdivisions divided by the total weight of all subdivisions is less that the minimum fraction of retained weight, some subdivisions having a total traffic less than said calculated threshold traffic value are added to said set of candidate subdivisions.

10. The apparatus including the computer based interactive device of claim 4 wherein said maximum radius is the maximum allowable distance from a terminal to the center of the subdivision to which it is assigned.

11. The apparatus including the computer based interactive device of claim 4 wherein said processor determining a location for each of said group of subdivisions makes its determination based on the center of the subdivision determined by the processor.

12. The apparatus including the computer based interactive device of claim 4 wherein said processor assigning terminals in a subdivision not included in said set of candidate subdivisions to a subdivision in said set of candidate subdivisions assigns such terminals to the nearest adjacent subdivision included in said set of candidate subdivisions.

13. The apparatus including the computer based interactive device of claim 12 wherein if there is no adjacent subdivision included in said set of candidate subdivisions, such a terminal remains in its own subdivision.

14. The apparatus including the computer based interactive device of claim 4 wherein said processor merging subdivisions in said set of candidate subdivisions into clusters does so based on the centers of said subdivisions in said set of candidate subdivisions.

15. The apparatus including the computer based interactive device of claim 14 wherein said processor merges nearest-neighbor subdivisions.

16. The apparatus including the computer based interactive device of claim 15 wherein the merging of nearest-neighbor clusters continues as long as the weight of the proposed merged cluster does not exceed the maximum weight of the largest of said terminal clusters and the radius of the proposed merged cluster does not exceed the maximum radius of said terminal clusters.

17. The apparatus including the computer based interactive device of claim 4 wherein said processor determining the representative locations of said clusters of said merged subdivisions does so by assigning the location of a terminal closest to the updated center of said clusters.

18. The apparatus including the computer based interactive device of claim 4 wherein each cluster can be constrained to a single local access and transport area.

19. The apparatus including the computer based interactive device of claim 4 wherein the location of the cluster centers can be manually selected.

20. The apparatus including the computer based interactive device of claim 4 wherein said user input device includes a data storage device in which said received set of terminal locations, said received set of weights and said received specified parameters are stored.

21. The apparatus including the computer based interactive device of claim 4, wherein the processor directs communication traffic from the first terminal to the second terminal via at least one of said backbone nodes and at least one of said concentrators.

22. The apparatus including the computer based interactive device of claim 4, wherein said backbone nodes comprise data switches.

23. The apparatus including the computer based interactive device of claim 4, wherein said concentrators comprise multiplexers.

24. An apparatus for effectively connecting a number of terminals through backbone nodes, a backbone, and concentrators, including a computer based interactive device for aggregating the terminals into clusters of a distributed communications network having a plurality of terminals, backbone nodes for routing traffic within a backbone, and concentrators connected between said terminals and said backbone nodes, said computer based interactive device comprising:

a) a user input device of said computer receiving inputs including:

a first set of data corresponding to terminal locations to be clustered, and a second set of data corresponding to weights corresponding to the traffic carried by each terminal location;

and said user input device of said computer receiving specified parameters including:

a total number of terminal clusters to be formed, a minimum weight of a smallest of said terminal clusters to be formed, a maximum weight of a largest of said terminal clusters to be formed, and a maximum radius of said terminal clusters to be formed;

said user input device selecting a system output mode;

b) a processor of said computer creating a number of subdivisions, wherein the square of the number of subdivisions is less than or equal to the number of terminals;

said processor assigning each terminal to one of said number of subdivisions;

said processor determining a total traffic for each of said number of subdivisions;

said processor determining a center of each of said number of subdivisions;

said processor forming a set of candidate subdivisions including some of said number of subdivisions;

said processor defining a location for each of said number of subdivisions;

said processor assigning terminals in a subdivision not included in said set of candidate subdivisions to a subdivision in said set of candidate subdivisions;

said processor merging subdivisions in said set of candidate subdivisions into clusters;

said processor updating centers of said clusters of merged subdivisions;

said processor determining the representative locations of said clusters of said merged subdivisions; and said processor directing communication traffic from a first of said terminals through said representative location of the cluster in which said first terminal is located to a second of said terminals through said representative location of the cluster in which said second terminal is located.

25. The apparatus including the computer based interactive device of claim 24, wherein said backbone nodes comprise data switches.

26. The apparatus including the computer based interactive device of claim 24, wherein said concentrators comprise multiplexers.

27. The apparatus including the computer based interactive device of claim 24, wherein the processor directs communication traffic from the first terminal to the second terminal via at least one of said backbone nodes and at least one of said concentrators.

28. A method for efficiently connecting a number of terminals through backbone nodes, a backbone, and concentrators including a computer based interactive method for aggregating the terminals into clusters of a distributed communications network having a plurality of terminals, backbone nodes for routing traffic within a backbone, and concentrators connected between said terminals and said backbone nodes, said computer based interactive method comprising steps of:

inputting to said computer a first set of data corresponding to terminal locations to be clustered;

inputting to said computer a second set of data corresponding to weights corresponding to the traffic carried by each terminal location;

receiving in said computer specified parameters including a total number of terminal clusters to be formed, a minimum weight of a smallest of said terminal clusters to be formed, a maximum weight of a largest of said terminal clusters to be formed, and a maximum radius of said terminal clusters to be formed;

selecting a system output mode;

creating a number of subdivisions based on said total number of terminal clusters to be formed, wherein the square of the number of subdivisions is less than or equal to the number of terminals;

assigning each terminal to one of said subdivisions based on its location;

determining a total traffic for each of said subdivisions based on the weights of the terminals assigned to it by said assigning step;

determining a center of each of said subdivisions based on the weights and the locations of the terminals assigned to it by said assigning step;

forming a set of candidate subdivisions based on the total traffic for each of said subdivisions;

defining a location for each of said subdivisions;

assigning terminals in a subdivision not included in said set of candidate subdivisions to a subdivision in said set of candidate subdivisions;

merging subdivisions in said set of candidate subdivisions into clusters;

updating centers of said clusters of merged subdivisions based on the weights and the locations of terminals of said clusters;

determining the representative locations of said clusters of said merged subdivisions; and directing communication traffic from a first of said terminals through said representative location of the cluster in which said first terminal is located to a second of said terminals through said representative location of the cluster in which said second terminal is located.

29. The method including the computer implemented interactive method of claim 28 wherein:

said step of creating the number of subdivisions is performed by executing a first group of processor implemented instructions;

said step of assigning each terminal to one of said subdivisions is performed by executing a second group of processor implemented instructions;

said step of determining a total traffic for each of said subdivisions is performed by executing a third group of processor implemented instructions;

said step of determining a center of each of said subdivisions is performed by executing a fourth group of processor implemented instructions;

said step of forming a set of candidate subdivisions is performed by executing a fifth group of processor implemented instructions;

said step of defining a location for each or said subdivisions is performed by executing a sixth group of processor implemented instructions;

said step of assigning terminals in a subdivision not included in said set of candidate subdivisions to a subdivision in said set of candidate subdivisions is performed by executing a seventh group of processor implemented instructions;

said step of merging subdivisions in said set of candidate subdivisions into clusters is performed by executing an eighth group of processor implemented instructions;

said step of updating centers of said clusters of merged subdivisions is performed by executing a ninth group of processor implemented instructions;

said step of determining the representative locations of said clusters of said merged subdivisions is performed by executing a tenth group of processor implemented instructions; and said step of directing communication traffic is performed by executing an eleventh group of processor implemented instructions.

30. The method including the computer implemented interactive method of claim 28, wherein said system output mode is selected from a group of output modes consisting of virtual terminals, candidate backbone sites, and candidate concentrator sites.

31. The method including the computer implemented interactive method of claim 28, wherein said specified parameters further include a minimum fraction of retained subdivisions and a minimum fraction of retained weight, and wherein said step of forming a set of candidate subdivisions further includes steps of:

calculating a threshold traffic value based on the average traffic of terminals in a subdivision, comparing the total traffic for each determined subdivision with the calculated threshold traffic value, and adding a subdivision to said set of candidate subdivisions if its total traffic is at least equal to said calculated threshold traffic value.

32. The method including the computer implemented interactive method of claim 31, wherein if the number of subdivisions in said set of candidate subdivisions divided by the total number of subdivisions is less than the minimum fraction of retained subdivisions, some subdivisions having a total traffic less than said calculated threshold traffic value are added to said set of candidate subdivisions.

33. The method including the computer implemented interactive method of claim 31, wherein if the total weight of the subdivisions in said set of candidate subdivisions divided by the total weight of all subdivisions is less that the minimum fraction of retained weight, some subdivisions having a total traffic less than said calculated threshold traffic value are added to said set of candidate subdivisions.

34. The method including the computer implemented interactive method of claim 28, wherein said maximum radius is the maximum allowable distance from a terminal to the center of the subdivision to which it is assigned.

35. The method including the computer implemented interactive method of claim 28, wherein said step of determining a location for each of said subdivisions makes its determination based on the center of the determined subdivision.

36. The method including the computer implemented interactive method of claim 28, wherein said step of assigning terminals in a subdivision not included in said set of candidate subdivisions to a subdivision in said set of candidate subdivisions assigns such terminals to the nearest adjacent subdivision included in said set of candidate subdivisions.

37. The method including the computer implemented interactive method of claim 36, wherein if there is no adjacent subdivision included in said set of candidate subdivisions, such a terminal remains in its own subdivision.

38. The method including the computer implemented interactive method of claim 28, wherein said step of merging subdivisions in said set of candidate subdivisions into clusters does so based on the centers of subdivisions in said set of candidate subdivisions.

39. The method including the computer implemented interactive method of claim 38, wherein said step of merging merges nearest-neighbor subdivisions.

40. The method including the computer implemented interactive method of claim 39, wherein the merging of nearest-neighbor clusters continues as long as the weight of the proposed merged cluster does not exceed the maximum weight of the largest of said terminal clusters and the radius of the proposed merged cluster does not exceed the maximum radius of said terminal clusters.

41. The method including the computer implemented interactive method of claim 28, wherein said step of determining the representative locations of said clusters of said merged subdivisions does so by assigning the location of a terminal closest to the updated center of said clusters.

42. The method including the computer implemented interactive method of claim 28, wherein each cluster can be constrained to a single local access and transport area.

43. The method including the computer implemented interactive method of claim 28, wherein the location of the cluster centers can be manually selected.

44. The method including the computer implemented interactive method of claim 28, further comprising a step of storing said received set of terminal locations, said received set of weights and said received specified parameters.

45. The method including the computer implemented interactive method of claim 28, wherein said backbone nodes comprise data switches.

46. The method including the computer implemented interactive method of claim 28, wherein said concentrators comprise multiplexers.

47. The method for efficiently connecting terminals including the computer implemented method of claim 28, wherein the step of directing communication traffic further includes directing communication traffic from the first terminal to the second terminal via at least one of said backbone nodes and at least one of said concentrators.

48. A method for effectively connecting a number of terminals through backbone nodes, a backbone, and concentrators, including a computer implemented interactive method for aggregating the terminals into clusters of a distributed communications network having a plurality of terminals, backbone nodes for routing traffic within a backbone, and concentrators connected between said terminals and said backbone nodes, said computer implemented interactive method comprising steps of:

inputting to said computer a first set of data corresponding to terminal locations to be clustered;

inputting to said computer a second set of data corresponding to weights corresponding to the traffic carried by each terminal location;

receiving in said computer specified parameters including a total number of terminal clusters to be formed, a minimum weight of a smallest of said terminal clusters to be formed, a maximum weight of a largest of said terminal clusters to be formed, and a maximum radius of said terminal clusters to be formed;

selecting a system output mode;

creating a number of subdivisions, wherein the square of the number of subdivisions is less than or equal to the number of terminals;

assigning each terminal to one of said subdivisions;

determining a total traffic for each of said subdivisions;

determining a center of each of said subdivisions;

forming a set of candidate subdivisions including some of said subdivisions;

defining a location for each of said subdivisions;

assigning terminals in a subdivision not included in said set of candidate subdivisions to a subdivision in said set of candidate subdivisions;

merging subdivisions in said set of candidate subdivisions into clusters;

updating centers of said clusters of merged subdivisions;

determining the representative locations of said clusters of said merged subdivisions; and directing communication traffic from a first of said terminals through said representative location of the cluster in which said first terminal is located to a second of said terminals through said representative location of the cluster in which said second terminal is located.

49. The method including the computer implemented interactive method of claim 48, wherein said backbone nodes comprise data switches.

50. The method including the computer implemented interactive method of claim 48, wherein said concentrators comprise multiplexers.

51. The method for efficiently connecting terminals including the computer implemented method of claim 48, wherein the step of directing communication traffic includes directing communication traffic from the first terminal to the second terminal via at least one of said backbone nodes and at least one of said concentrators.

* * * * *

UNITED STATES PATENT AND TRADEMARK OFFICE
CERTIFICATE OF CORRECTION

PATENT NO. : 5,652,841
DATED : 29 July 1997
INVENTOR(S) : Paul Nemirovsky et al.

It is certified that error appears in the above-identified patent and that said Letters Patent is hereby corrected as shown below:

| Column | Line | |
|---|---|---|
| 1 | 33 | After "input" delete ","; after "rate" delete ",". |
| 3 | 15 | After "method" insert --and apparatus--. |
| 3 | 24 | Change "$N_i$" to --$N_1$--. |
| 3 | 25 | Change "$TL_i$, $CL_i$, and $BL_i$" to --$TL_1$, $CL_1$, and $BL_1$--. |
| 8 | 15 | Change "dusters" to --clusters--. |
| 10 | 32 | After "28" insert --,--. |
| 11 | 32 | Change "that" to --than--. |

Signed and Sealed this

Seventeenth Day of March, 1998

Attest:

BRUCE LEHMAN

Attesting Officer    Commissioner of Patents and Trademarks